US011341328B2

(12) United States Patent
Atwal et al.

(10) Patent No.: US 11,341,328 B2
(45) Date of Patent: May 24, 2022

(54) DYNAMIC GRAMMAR AUGMENTATION FOR EDITING MULTIPLE NETWORK SWITCH CONFIGURATION FILES AS A SINGLE FILE

(71) Applicant: Hewlett Packard Enterprise Development LP, Houston, TX (US)

(72) Inventors: Gurraj Atwal, Roseville, CA (US); Frank Wood, Roseville, CA (US); Shaun Wackerly, London, KY (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 454 days.

(21) Appl. No.: 16/206,787

(22) Filed: Nov. 30, 2018

(65) Prior Publication Data

US 2020/0175103 A1 Jun. 4, 2020

(51) Int. Cl.
*G06F 40/253* (2020.01)
*G06F 8/71* (2018.01)
*H04L 12/46* (2006.01)
*H04L 41/084* (2022.01)

(52) U.S. Cl.
CPC ........ *G06F 40/253* (2020.01); *H04L 12/4641* (2013.01); *H04L 41/084* (2013.01); *G06F 8/71* (2013.01)

(58) Field of Classification Search
CPC ..... G06F 40/253; G06F 8/71; H04L 12/4641; H04L 41/084
See application file for complete search history.

(56) References Cited

U.S. PATENT DOCUMENTS

| | | | |
|---|---|---|---|
| 7,155,534 B1 * | 12/2006 | Meseck | H04L 41/0853 709/238 |
| 8,572,572 B2 | 10/2013 | Morgan et al. | |
| 8,959,194 B1 * | 2/2015 | Deng | H04L 41/084 709/223 |
| 9,286,047 B1 * | 3/2016 | Avramov | G06F 8/60 |
| 9,766,860 B2 | 9/2017 | Bitner et al. | |
| 9,787,722 B2 | 10/2017 | Knjazihhin et al. | |
| 10,282,346 B1 * | 5/2019 | Lue | H04L 67/34 |

(Continued)

OTHER PUBLICATIONS

Röthlisberger, David, "Augmenting Ides with Runtime Information for Software Maintenance", (Research Paper), May 2010, 322 pages.

*Primary Examiner* — Daniel C Washburn
*Assistant Examiner* — Oluwadamilola M Ogunbiyi
(74) *Attorney, Agent, or Firm* — Sheppard Mullin Richter & Hampton LLP

(57) ABSTRACT

Systems and methods are provided for dynamic grammar augmentation for editing multiple network switch configuration files as a single file. The method includes identifying a first base grammar of a first network switch; identifying a second base grammar of a second network switch; identifying first and second patch grammars for the first and second network switches; generating an augmented grammar based on the first and second patch grammars and the first and second base grammars; identifying a first configuration file for the first network switch; identifying a second configuration file for the second network switch; generating a base merged configuration file, the base merged configuration file representing the first and second configuration files modified according to the augmented grammar.

20 Claims, 8 Drawing Sheets

(56) References Cited

U.S. PATENT DOCUMENTS

| | | | |
|---|---|---|---|
| 2007/0073851 A1* | 3/2007 | Baikov | H04L 41/084 709/220 |
| 2011/0142051 A1* | 6/2011 | Bhatt | H04L 45/02 370/392 |
| 2012/0130950 A1* | 5/2012 | Jain | G06F 16/184 707/634 |
| 2013/0304775 A1* | 11/2013 | Davis | H04L 67/1097 707/827 |
| 2015/0207808 A1* | 7/2015 | Bonney | G06F 11/3051 726/23 |
| 2016/0050116 A1* | 2/2016 | Sheshadri | H04L 67/10 709/221 |
| 2017/0041188 A1* | 2/2017 | Panchapakesan | H04L 41/0809 |
| 2017/0109104 A1 | 4/2017 | Dahlberg et al. | |
| 2017/0244784 A1* | 8/2017 | Lam | G06F 9/5077 |
| 2017/0257439 A1* | 9/2017 | Wang | H04W 48/08 |
| 2017/0353516 A1* | 12/2017 | Gordon | H04L 67/10 |
| 2018/0024783 A1* | 1/2018 | Yoshida | G06F 3/1228 358/1.1 |
| 2018/0026829 A1* | 1/2018 | Bhatia | E21B 34/063 709/223 |
| 2018/0026854 A1* | 1/2018 | Bhatia | G06F 16/13 715/735 |
| 2018/0255043 A1* | 9/2018 | Teiste | H04L 63/0245 |
| 2019/0020545 A1* | 1/2019 | Washenko | H04L 41/0883 |
| 2019/0097991 A1* | 3/2019 | Borle | H04L 63/0853 |
| 2019/0238403 A1* | 8/2019 | Wang | H04L 41/0806 |
| 2019/0394087 A1* | 12/2019 | Nadella | H04L 12/4641 |
| 2020/0034132 A1* | 1/2020 | U | H04L 67/10 |
| 2020/0076694 A1* | 3/2020 | Drury | H04L 12/2838 |
| 2020/0084098 A1* | 3/2020 | Wang | H04L 67/34 |
| 2020/0301876 A1* | 9/2020 | Hamlin | G06F 15/17325 |

* cited by examiner

FIG. 5A

A: neighbor (A.B.C.D|X:X::X:X|WORD) remote-as (<1-4294967295> | <ASN:0.1-65535.65535>)
B: neighbor (A.B.C.D|WORD) remote-as (<1-4294967295> | <ASN:0.1-65535.65535>)  ← removed

FIG. 5B

A: radius-server host WORD {port <1-65535> | acct-port <1-65535> | timeout <1-60> | key (plaintext|ciphertext) WORD | retries <0-5> | auth-type (pap | chap) | vrf VRF_NAME}
B: radius-server host WORD {port <1-65535> | timeout <1-60> | key (plaintext|ciphertext) WORD | retries <0-5> | auth-type (pap | chap) | vrf VRF_NAME}  ← removed

FIG. 5C

A: no neighbor (A.B.C.D|WORD) maximum-prefix <1-128000> warning-only
B: no neighbor (A.B.C.D|WORD) maximum-prefix <1-64000> warning-only  ← removed

DYNAMIC GRAMMAR AUGMENTATION FOR EDITING MULTIPLE NETWORK SWITCH CONFIGURATION FILES AS A SINGLE FILE

DESCRIPTION OF RELATED ART

A programming language is defined by its grammar, which may restrict the commands, parameters, and syntax that may be used in the language. The configuration files used to configure network switches generally conform to a similar grammar, but one that is specific to the configuration of such switches.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5A shows examples of subsumed commands being removed and shows the removal of a subset command in BGP NODE.

FIG. 5B shows examples of subsumed commands being removed and shows the removal of a subset command in CONFIG NODE.

FIG. 5C shows examples of subsumed commands being removed and shows the removal of a subset command in BGP NODE.

The figures are not exhaustive and do not limit the present disclosure to the precise form disclosed.

DETAILED DESCRIPTION

Embodiments provide editors for editing configuration files of multiple network switches as a single file. But while various embodiments are described in terms of editing configuration files for network switches, it should be noted that the technology described herein may be employed to edit configuration files for any configurable devices.

Returning to the example of network switches, the switches may be of the same or different models, and thus may employ the same or different configuration grammars. The base grammar of each switch may be obtained, either directly from the switch or from other sources. The base grammar of a switch is the definition of which commands are valid in which context on the switch, along with the syntax for each command. A patch grammar may be identified for each of the network switches. Each patch grammar may include (i) grammar known to be supported by the switch, but not included in the base grammar of the switch, and (ii) grammar that allows these grammars to be combined with the grammars of other switches. The base grammars and patch grammars of multiple switches may be combined to form a single grammar, referred to herein as an "augmented grammar." This augmented grammar allows the configuration files of the switches to be displayed, validated, and edited as a single file, referred to herein as a base merged configuration file. After validation, a respective configuration file may be modified or generated for each switch, and installed at the respective switches.

In various implementations, multiple configuration files may be edited as a single file. Previously each configuration file had to be edited individually. Any error encountered after editing numerous configuration files would require all of those configuration files to be edited again.

Furthermore, embodiments may be implemented to allow validation to be performed almost entirely "off box," that is, on a platform separate from the switch. Final validation of the resulting configuration file is performed "on box" but as a single operation for a configuration file that has already passed through "off box" validation. Thus operation of each switch may be unaffected until the validated configuration file is installed in the switch. Previously validation was performed "on box" only, and only one command at a time using a command line interface.

Figure 1:
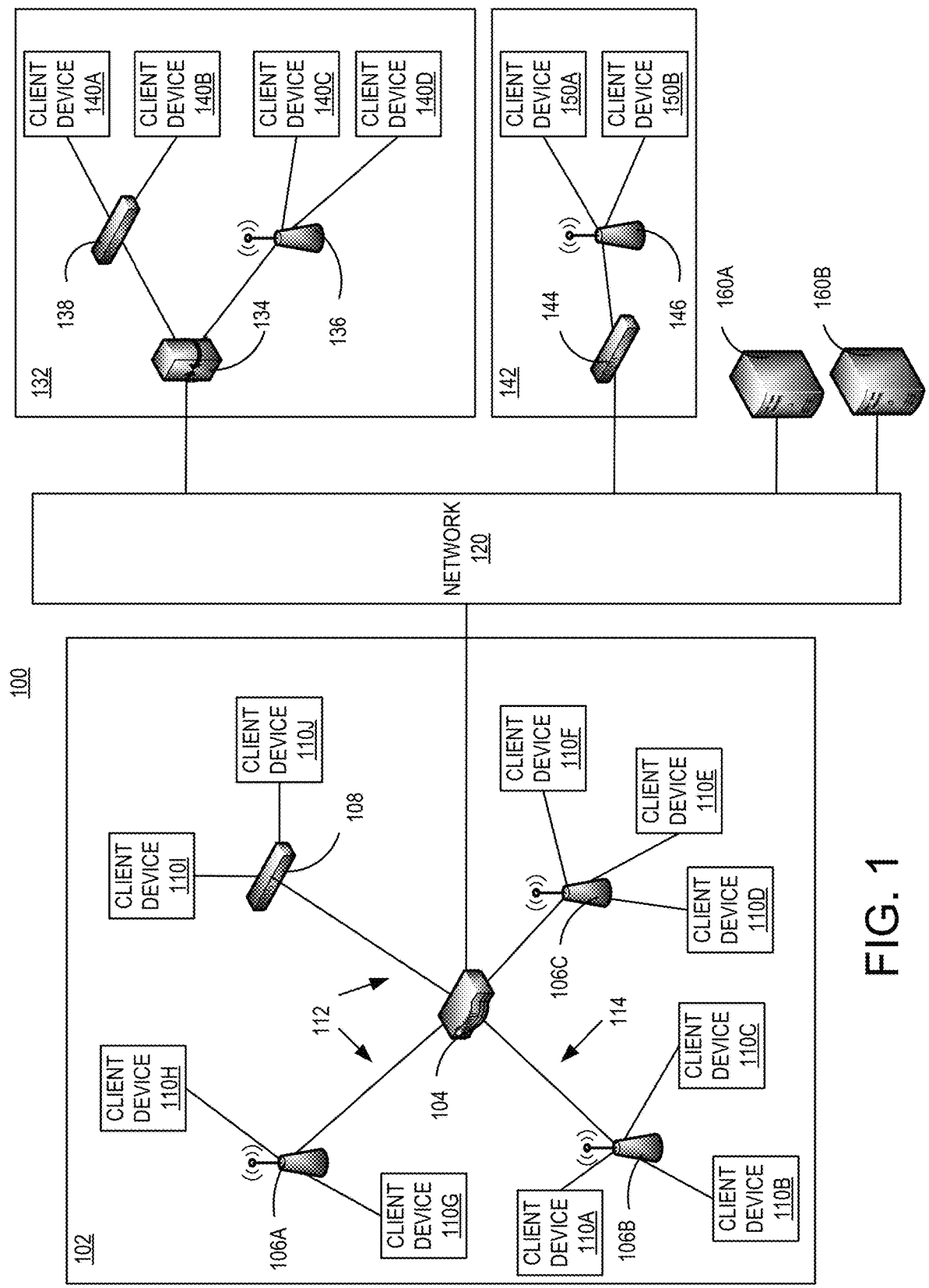
FIG. 1 illustrates one example of a network topology that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network topology 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network topology 100 may include a primary site 102 in communication with a network 120. The network topology 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106*a-c*. Switches 108 and wireless APs 106*a-c* provide network connectivity to various client devices 110*a-j*. Using a connection to a switch 108 or AP 106*a-c*, a client device 110*a-j* may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network topology 100. The client devices 110*i-j* may also be able to access the network 120, through the switch 108. The client devices 110*i-j* may communicate with the switch 108 over a wired 112 connection. In the illustrated example, the switch 108 communicates with the controller 104 over a wired 112 connection, though this connection may also be wireless.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the illustrated example, APs 106*a-c* can be managed and configured by the controller 104. APs 106*a-c* communicate with the controller 104 and the network over connections 112, which may be either wired or wireless interfaces.

The network topology 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network topology 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network topology 100 but that facilitate communication between the various parts of the network topology 100, and between the network topology 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

Figure 2:
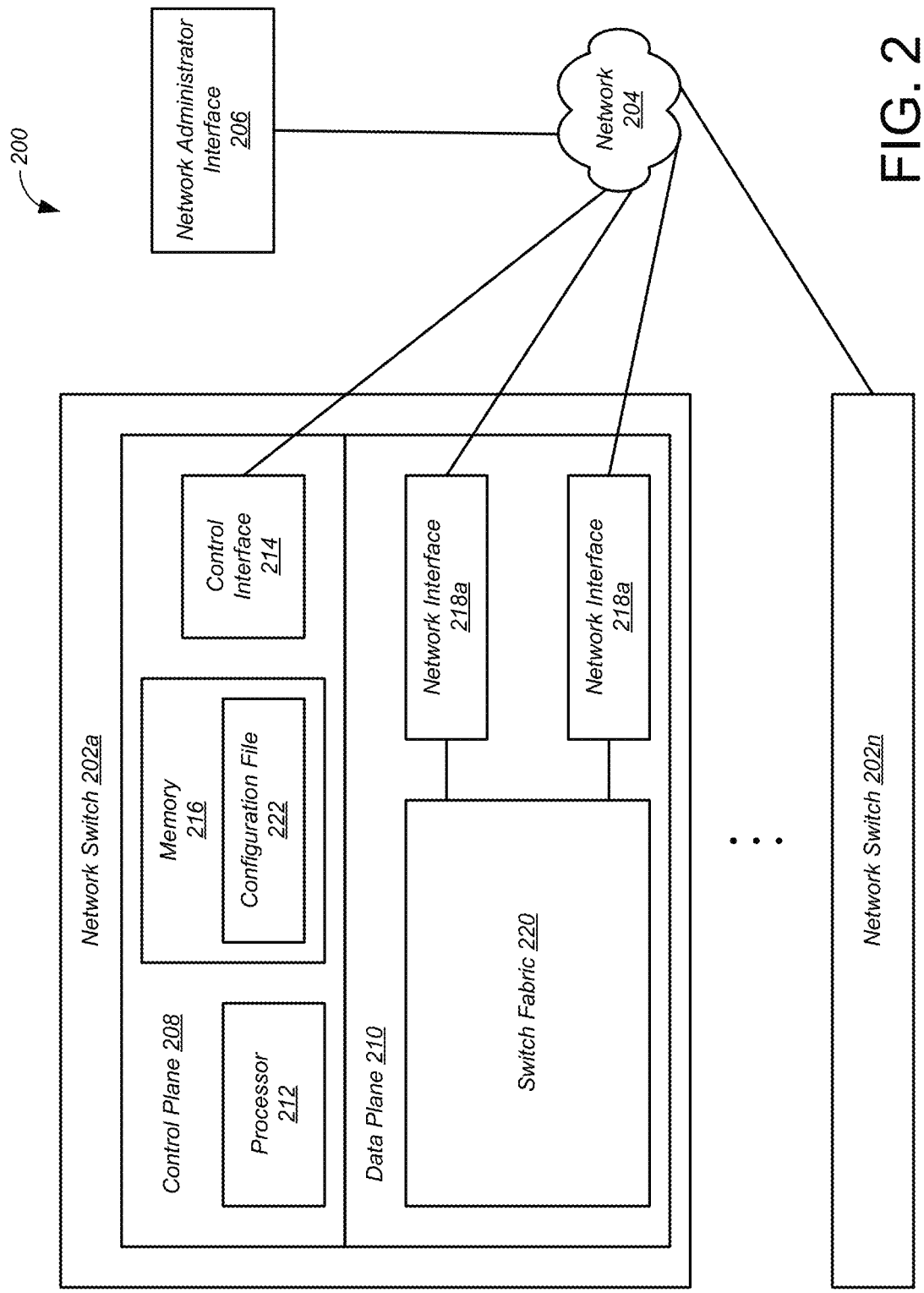
FIG. 2 is a block diagram of an example system in which embodiments described herein may be implemented.

Now embodiments of the disclosed systems and methods will be described in detail. FIG. 2 is a block diagram of an example system 200 in which embodiments described herein may be implemented. Referring to FIG. 2, the example system 200 includes a plurality of network switches 202*a-n* connected to a network 204, and a network administrator interface 206, also connected to the network 204.

The network switch 202 may include a control plane 208 and a data plane 210. The control plane 208 may include a processor 212, a control interface 214, and a memory 216. The memory 216 may store a configuration file 222, according to which the network switch 202 operates. The control interface 214 may be connected to the network 204. The data plane 210 includes a switch fabric 220 and a plurality of network interfaces 218a-n. The network interfaces 218a-n may be connected to the network 204.

The network administrator interface 206 may be used by a network administrator to configure the network switch 202 through the control interface 214 of the network switch 202. For example, a network administrator may use the network administrator interface 206 to obtain, edit, and replace the configuration file 222 stored in the memory 216 of the network switch 202, as described in detail below.

Figure 3:
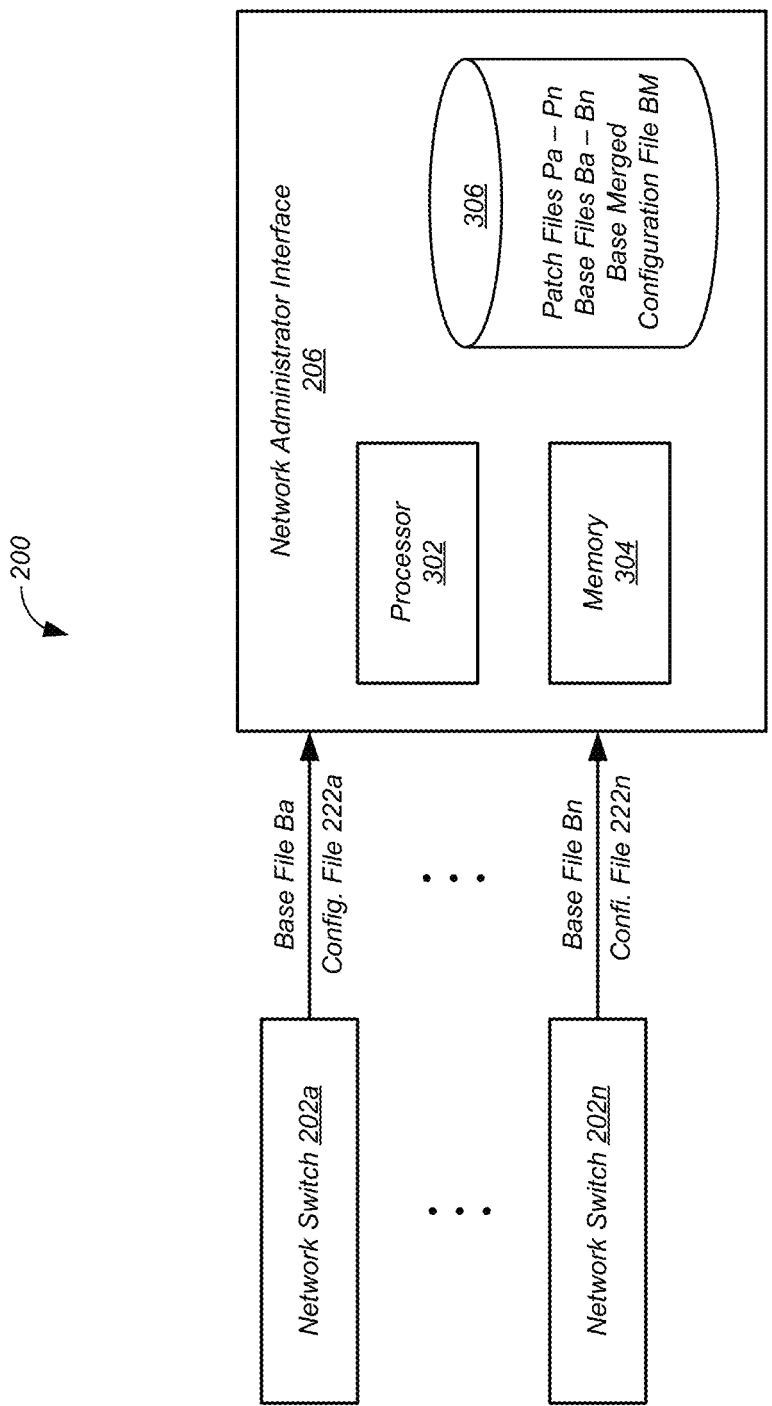
FIG. 3 illustrates an example use of files in the system of FIG. 2.

The described embodiments employ several different files. FIG. 3 illustrates an example use of these files in the system 200 of FIG. 2. For clarity, these files are described here with reference to FIG. 3. Referring to FIG. 3, additional detail is shown for the network administrator interface 206. In particular, the network administrator interface 206 includes a processor 302, a memory 304, and a database 306. The database 306 may store a base file for each network switch 202. That is, the database 306 may store base files Ba-n for network switches 202a-n, respectively. Each base file B represents the configuration grammar present in the respective network switch 202. The base files Ba-n may be obtained directly from the network switch 202a-n, from other sources, or from any combination thereof.

The database 306 may store a respective patch file Pa-n for each of the network switches 202a-n. Each patch file P represents an augmentation grammar that is not provided by the respective network switch 202, but is employed by various embodiments to augment the respective base grammar B such that the configuration files 222 of the network switches 202 can be displayed, validated, and edited as a single file, referred to herein as the base merged configuration file BM, also shown in FIG. 3.

Figure 4A:
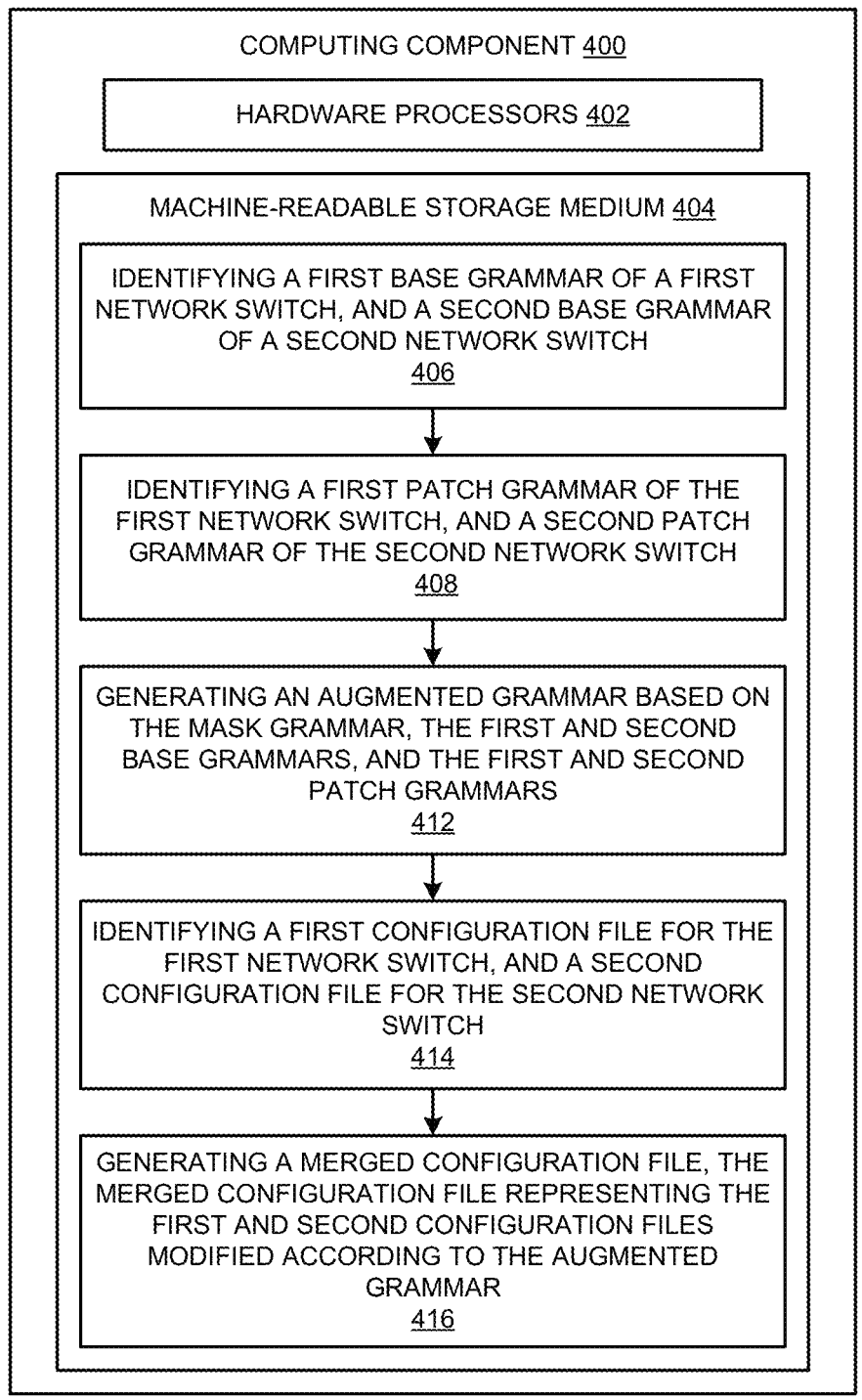
FIG. 4A is a block diagram of an example computing component or device for dynamic grammar augmentation for editing multiple network switch configuration files as a single file in accordance with one embodiment.
Figure 4B:
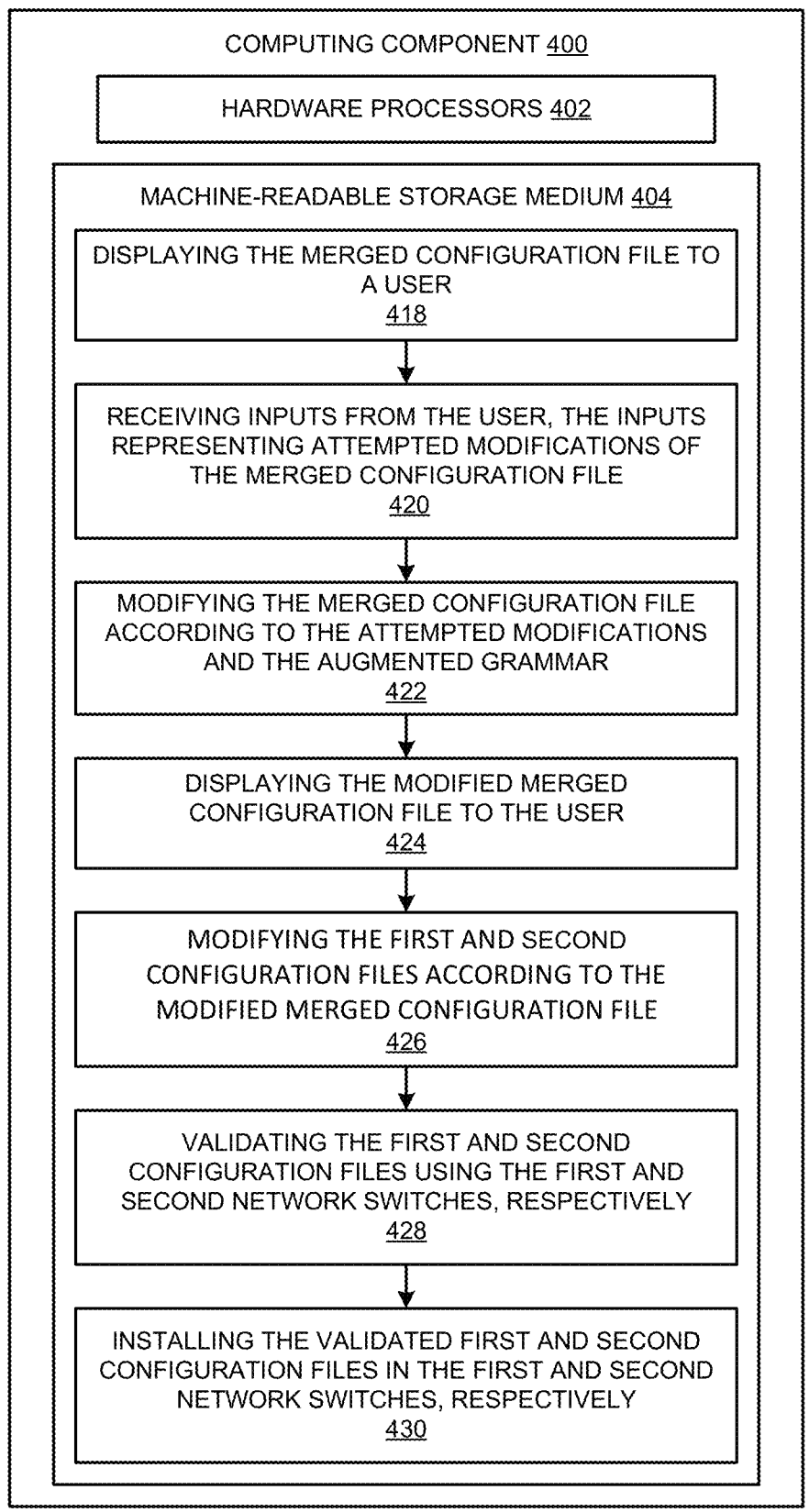
FIG. 4B is a block diagram of an example computing component or device for dynamic grammar augmentation for editing multiple network switch configuration files as a single file in accordance with one embodiment.

FIG. 4 is a block diagram of an example computing component or device 400 for dynamic grammar augmentation for editing multiple network switch configuration files as a single file in accordance with one embodiment. Computing component 400 may be, for example, a server computer, a controller, or any other similar computing component capable of processing data. In the example implementation of FIG. 4, the computing component 400 includes a hardware processor 402 and a machine-readable storage medium 404.

In some embodiments, computing component 400 may be an embodiment of the processor 302 of the network administrator interface 206, the processor 212 of the network switch 202, or any combination thereof.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as instructions 406-430, to control processes or operations for dynamic grammar augmentation for editing multiple network switch configuration files as a single file. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-430.

For clarity, the operation of example computing component or device 400 will be explained for configuring two network switches 202a and 202n. However, it will be understood that the operation may be extended to other numbers of network switches 202.

Hardware processor 402 may execute instruction 406 to perform identifying a first base grammar Ba of a first network switch 202a, and a second base grammar Bn of a second network switch 202n. As mentioned above, the base grammars Ba,n may be stored in the database 306 of the network administrator interface 206. Identifying the base grammars B may include input filtering of the base grammars Ba,n. For example, a base grammar B may include comments, and these comments may be removed from the local copy of the base grammar. Filtering may also include removing or altering commands that are not useful for "off box" configuration.

Hardware processor 402 may execute instruction 408 to perform identifying a first patch grammar Pa of the first network switch 202a, and a second patch grammar Pn of the second network switch 202n. As mentioned above, the patch grammars Pa,n may be stored in the database 306 of the network administrator interface 206.

Hardware processor 402 may execute instruction 412 to perform generating an augmented grammar based on the first and second base grammars Ba,n, and the first and second patch grammars Pa,n. In particular, this may include all or part of the process described now.

The base files Ba,n are read and processed. For each context, and for each command in that context, the command is added to an augmented grammar if the command doesn't already exist in the augmented grammar. Commands are added either in first-come order, or using relative ordering. Relative ordering means that the command appears in the same order in the augmented grammar relative to commands from the respective base file B. This process may be repeated for each base file Ba,n and each patch file Pa,n.

The augmented grammar may be compiled to generate an in-memory view, for example in the memory 304 of the network administrator interface 206. Then the following process may be performed for each command in the augmented grammar. All of the other commands in the augmented grammar are analyzed to determine whether the two commands are identical aside from term ordering, and whether one command can subsume the other command. A command A can subsume command B if all of the following are true: A contains the same number of terms as B, A contains all of B's keywords in the same order, and each term in A is equivalent to, or a superset of, the corresponding term in B. Equivalent terms include terms which are identical, selection sets with sub-terms specified in a different order (e.g., (x|y|z)==(z|y|x)), and regular expressions which match the same value (e.g., VLAN-ID==<1-4094>). Superset terms include selection sets with all sub-terms included in the other set (e.g., (w|x|y|z)>(z|x|y)), ranges with all values included in the other set, (e.g., <1-24>><1-100>), and matrix sets with all sub-terms being equivalent or supersets.

All subsumed commands are removed from the augmented grammar. FIGS. 5A-C show examples of subsumed commands being removed. FIG. 5A shows the removal of a subset command in BGP_NODE. FIG. 5B shows the removal of a subset command in CONFIG_NODE. FIG. 5C shows the removal of a subset command in BGP_NODE. In each example, command A subsumes command B, and command B is removed.

In some embodiments, the augmented grammar is processed to resolve ambiguities. For each context and each command within that context, the process determines whether there is a sub-command which would overlap with the command. An overlap occurs when the command terms are identical, or the command terms begin with an identical, unique substring, that is, one command would auto-complete into the other command. The process reports detected ambiguities, with a generated example of each.

In some embodiments, the augmented grammar is processed to order commands. Previously grammar patch entries were added on a first-come basis. Consider two patch files for two network switches X, Y, respectively, with respective patch file entries given by X: A,B,D and Y: A,C,D,E, where each letter A,B,C,D,E represents a different command.

Under the previous approach, the resulting combined patch file entry would be A,B,D,C,E, because the entries for network switch X would be added first, then any missing entries for network switch Y would be added at the end. This approach results in an incorrect command order for network switch Y. Various embodiments instead add the entries to the combined file in an order similar to that in the product-specific patch.

In some embodiments, an iterative re-ordering algorithm corrects the combined command ordering until it matches the command ordering in all of the product-specific patch files P. This process ensures correct command ordering is retained during the optimization process. For instance, if in the example above command B is considered to be a subset of command E, then the resulting combined entry would be A,D,C,E. This ordering would be incorrect for both network switches X and Y. The re-ordering algorithm iterates on the combined patch file until a result is obtained that works for the ordering of both, namely A,C,D,E.

Figure 6A:
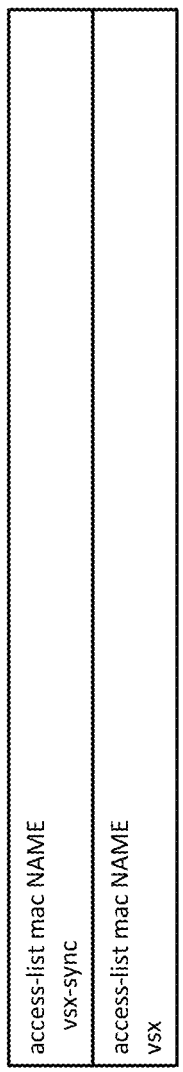
FIG. 6A shows example detected ambiguities and shows an example of an overlapping command, where the command 'vsx' in CONFIG NODE conflicts with the command 'vsx-sync' in ACCESS LIST MAC NODE.
Figure 6B:
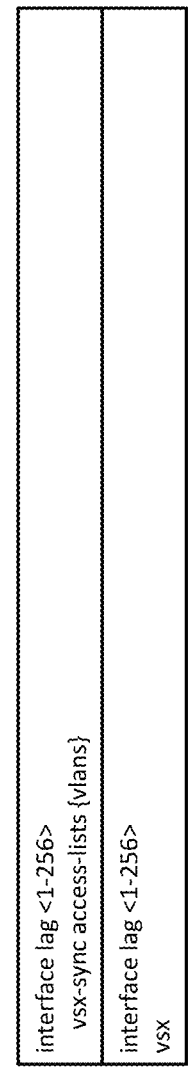
FIG. 6B shows example detected ambiguities and shows another example of an overlapping command, where the command 'vsx' in CONFIG NODE conflicts with the command 'vsx-sync access-lists {vlans}' in LINK AGGREGATION NODE.

FIGS. 6A-B show example detected ambiguities. FIG. 6A shows an example of an overlapping command, where the command 'vsx' in CONFIG_NODE conflicts with the command 'vsx-sync' in ACCESS_LIST_MAC_NODE. FIG. 6B shows another example of an overlapping command, where the command 'vsx' in CONFIG_NODE conflicts with the command 'vsx-sync access-lists {vlans}' in LINK_AGGREGATION_NODE.

Hardware processor 402 may execute instruction 414 to perform identifying a first configuration file 222a for the first network switch 202a, and a second configuration file 222n for the second network switch 202n. The configuration files 222a,n may be obtained from the network switches 202a,n, may be created locally by the network administrator, obtained from another source, or any combination thereof.

Hardware processor 402 may execute instruction 416 to perform generating a base merged configuration file BM, the base merged configuration file BM representing the first and second configuration files modified according to the augmented grammar. In some embodiments, generating the base merged configuration file BM includes combining the first and second base grammar files to form a combined base grammar. The augmented grammar may provide many grammar enhancements, for example such as those described below.

Hardware processor 402 may execute instruction 418 to perform displaying the base merged configuration file BM to a user. For example, the network administrator interface 216 may display the base merged configuration file BM to a network administrator.

Hardware processor 402 may execute instruction 420 to perform receiving inputs from the user, the inputs representing desired modifications of the base merged configuration file. For example, these inputs are received as a network administrator employs the network administrator interface 216 to edit the base merged configuration file BM.

Hardware processor 402 may execute instruction 422 to perform modifying the base merged configuration file according to the desired modifications and the augmented grammar. These modifications are termed "desired" because they are first validated using the augmented grammar before being used to modify the base merged configuration file BM, as described below and elsewhere in this description.

In some embodiments, the augmented grammar is used to provide enhanced command ordering that may not be present in the base files Ba,n. For example, a command which defines an entity must appear in the configuration file before any references to that entity. Therefore the process would place a "vlan trunk allowed" command, after the VLAN is defined.

In some embodiments, the augmented grammar is used to check command repeatability. Some commands may be repeated if the parameter differs, for example such as the "interface" command (e.g., "interface 1/1/1" and "interface 1/1/2" may be included in the same context). Some commands may be repeated, if in different contexts. For example, the "no shutdown" command may be included in both the "interface 1/1/1" and "interface 1/1/2" contexts. Some commands may not be repeated, for example "hostname." The process displays these checks for the user, and may automatically correct the errors as well.

In some embodiments, the augmented grammar is used to identify keywords so that the same commands from different switches, with different keyword values, can be shown as one command with the different keywords shown as a generic keyword, for example highlighted in all capital letters. For example, the command "hostname SW01" from a first switch, and a command "hostname SW02" from a second switch, may be shown together as a single entry as "hostname NAME" with "NAME" representing both SW01 and SW02.

In some embodiments, the augmented grammar is used to hide passwords, for example by replacing each character with an asterisk.

In some embodiments, the augmented grammar is used to check keyword values for validity as they are entered by the user. For example, for the command "vlan VLAN," the value of VLAN must be numeric, and in the range 1-4094. The system may display this range after the user enters the command, and if the user's entry is invalid, may give the user a warning.

In some embodiments, the augmented grammar is used to prevent the user from modifying read-only values, for example such as encoded values representing user scripts.

In some embodiments, the augmented grammar is used to replace unique commands if a grouped value for the command changes. For example, in the context of the command "access-list ip foo," if the user inputs the entry "2 permit" and subsequently inputs the entry "2 deny," the system replaces the former entry with the latter entry due to the grouping of "permit" and "deny" in the context of an access list command.

Hardware processor 402 may execute instruction 424 to perform displaying the modified base merged configuration file BM to the user. If the user is happy with the displayed base merged configuration file, the user may request validation against the network switches 202a,n.

If the user is happy with the validation of the configuration files 222a,n, the user may use the modified base merged configuration file BM to update or replace the local copies of the first and second configuration files 222a,n. That is, hardware processor 402 may execute instruction 426 to perform modifying the first and second configuration files 222a,n according to the modified base merged configuration file BM. In particular, the portion of the base merged configuration file BM that is relevant to each configuration file 222 is applied to that configuration file 222.

The user may validate each configuration file 222 against its network switch 222. That is, hardware processor 402 may execute instruction 428 to perform validating the first and second configuration files 222a,n using the first and second network switches 202a,n, respectively. Each configuration file 222 is validated by being entered at the respective network switch 202, and requesting validation, for example using the command line interface of the network switch 202.

The user may install the validated configuration files 222 in the network switches 202. That is, hardware processor 402 may execute instruction 430 to perform installing the validated first and second configuration files 222a,n in the first and second network switches 202a,n, respectively. However, validation against the network switches is not required, and may be omitted prior to installation of the configuration files 222 in the network switches 202. At this point the network switches 202a,n may operate according to the newly installed configurations files 222a,n, respectively.

Figure 7:
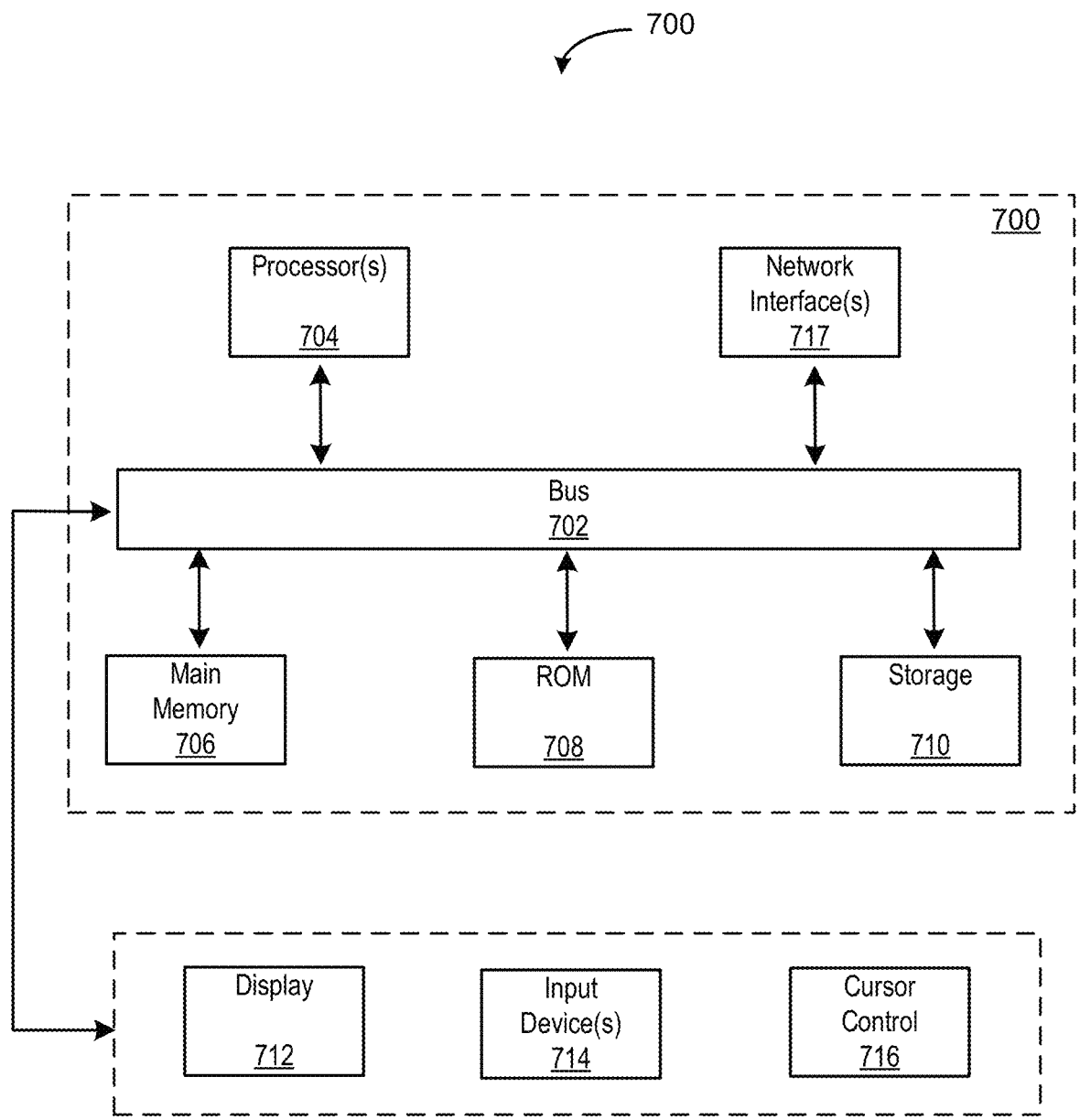
FIG. 7 depicts a block diagram of an example computer system in which various embodiments described herein may be implemented.

FIG. 7 depicts a block diagram of an example computer system 700 in which various embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a hardware processor; and
a non-transitory machine-readable storage medium encoded with instructions executable by the hardware processor to perform a method comprising:
identifying a first base grammar of a first network switch;
identifying a first patch grammar for the first network switch;
identifying a second base grammar of a second network switch;
identifying a second patch grammar for the second network switch;
generating an augmented grammar based on the first and second patch grammars and the first and second base grammars;
identifying a first configuration file for the first network switch;
identifying a second configuration file for the second network switch;
generating a base merged configuration file, the base merged configuration file representing the first and second configuration files modified according to the augmented grammar; and
installing the base merged configuration file at the first network switch or the second network switch, the installation of the base merged configuration file affecting operation of the first network switch or the second network switch in accordance with the base merged configuration file.

2. The system of claim 1, wherein the method further comprises:
receiving inputs from the user, the inputs representing desired modifications of the base merged configuration file;
modifying the base merged configuration file according to the desired modifications and the augmented grammar; and
displaying the modified base merged configuration file to the user.

3. The system of claim 2, wherein modifying the base merged configuration file according to the desired modifications and the augmented grammar comprises:
validating the desired modifications using the augmented grammar before modifying the base merged configuration file.

4. The system of claim 3, wherein the method further comprises:
modifying the first and second configuration files according to the modified base merged configuration file.

5. The system of claim 4, wherein the method further comprises:
validating the first and second configuration files using the first and second network switches, respectively.

6. The system of claim 5, wherein the method further comprises:
installing the validated first and second configuration files in the first and second network switches, respectively, wherein installation of the validated first and second configuration files affects operation of the first network switch and the second network switch in accordance with the validated first and second configuration files, respectively.

7. The system of claim 1, wherein generating the base merged configuration file comprises:
combining the first and second base grammars to form a combined base grammar.

8. A method comprising:
identifying a first base grammar of a first network switch;
identifying a first patch grammar for the first network switch;
identifying a second base grammar of a second network switch;
identifying a second patch grammar for the second network switch;
generating an augmented grammar based on the first and second patch grammars and the first and second base grammars;
identifying a first configuration file for the first network switch;
identifying a second configuration file for the second network switch;
generating a base merged configuration file, the base merged configuration file representing the first and second configuration files modified according to the augmented grammar; and
installing the base merged configuration file at the first network switch or the second network switch, the installation of the base merged configuration file affecting operation of the first network switch or the second network switch in accordance with the base merged configuration file.

9. The method of claim 8, further comprising:
receiving inputs from the user, the inputs representing desired modifications of the base merged configuration file;
modifying the base merged configuration file according to the desired modifications and the augmented grammar, comprising validating the desired modifications using the augmented grammar before modifying the base merged configuration file; and
displaying the modified base merged configuration file to the user.

10. The method of claim 9, further comprising:
modifying the first and second configuration files according to the modified base merged configuration file.

11. The method of claim 10, further comprising:
validating the first and second configuration files using the first and second network switches, respectively.

12. The method of claim 11, further comprising:
installing the validated first and second configuration files in the first and second network switches, respectively, wherein installation of the validated first and second configuration files affects operation of the first network switch and the second network switch in accordance with the validated first and second configuration files, respectively.

13. The method of claim 12, wherein generating the base merged configuration file comprises:
combining the first and second base grammars to form a combined base grammar.

14. A non-transitory machine-readable storage medium encoded with instructions executable by a hardware processor of a computing component, the machine-readable storage medium comprising instructions to cause the hardware processor to perform a method comprising:
identifying a first base grammar of a first network switch;
identifying a first patch grammar for the first network switch;

identifying a second base grammar of a second network switch;

identifying a second patch grammar for the second network switch;

generating an augmented grammar based on the first and second patch grammars and the first and second base grammars;

identifying a first configuration file for the first network switch;

identifying a second configuration file for the second network switch;

generating a base merged configuration file, the base merged configuration file representing the first and second configuration files modified according to the augmented grammar; and installing the base merged configuration file at the first network switch or the second network switch, the installation of the base merged configuration file affecting operation of the first network switch or the second network switch in accordance with the base merged configuration file.

15. The medium of claim 14, wherein the method further comprises:

receiving inputs from the user, the inputs representing desired modifications of the base merged configuration file;

modifying the base merged configuration file according to the desired modifications and the augmented grammar; and displaying the modified base merged configuration file to the user.

16. The medium of claim 15, wherein modifying the base merged configuration file according to the desired modifications and the augmented grammar comprises:

validating the desired modifications using the augmented grammar before modifying the base merged configuration file.

17. The medium of claim 16, wherein the method further comprises:

modifying the first and second configuration files according to the modified base merged configuration file.

18. The medium of claim 17, wherein the method further comprises:

validating the first and second configuration files using the first and second network switches, respectively.

19. The medium of claim 18, wherein the method further comprises:

installing the validated first and second configuration files in the first and second network switches, respectively, wherein installation of the validated first and second configuration files affects operation of the first network switch and the second network switch in accordance with the validated first and second configuration files, respectively.

20. The medium of claim 19, wherein generating the base merged configuration file comprises:

combining the first and second base grammars to form a combined base grammar.

* * * * *